US010011976B1

(12) United States Patent
Forcash et al.

(10) Patent No.: US 10,011,976 B1
(45) Date of Patent: Jul. 3, 2018

(54) SYSTEM AND METHOD FOR WORK TOOL RECOGNITION

(71) Applicant: Caterpillar Inc., Peoria, IL (US)

(72) Inventors: Joseph Forcash, Zelienpole, PA (US); Lawrence Andrew Mianzo, Pittsburgh, PA (US); Paul Edmund Rybski, Pittsburgh, PA (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/396,939

(22) Filed: Jan. 3, 2017

(51) Int. Cl.
*E02F 9/26* (2006.01)
*E02F 3/36* (2006.01)
*G06T 7/00* (2017.01)
*G06K 9/62* (2006.01)
*G06K 9/52* (2006.01)
(Continued)

(52) U.S. Cl.
CPC ............ *E02F 9/264* (2013.01); *E02F 3/3609* (2013.01); *G06K 9/52* (2013.01); *G06K 9/6201* (2013.01); *G06K 9/6267* (2013.01); *G06K 9/78* (2013.01); *G06T 7/0004* (2013.01); *G06T 7/74* (2017.01); *G06T 2207/30164* (2013.01)

(58) Field of Classification Search
CPC .......... E02F 9/264; E02F 3/3609; G06T 7/74; G06T 7/0004; G06T 2207/30164; G06K 9/52; G06K 9/6201; G06K 9/6267; G06K 9/78
See application file for complete search history.

(56) References Cited

U.S. PATENT DOCUMENTS 5,961,573 A * 10/1999 Hale ................... A01B 79/005
 172/4.5
7,574,821 B2 8/2009 Furem
(Continued)

FOREIGN PATENT DOCUMENTS

| EP | 1203632 A2 * | 5/2002 | ........... B32Q 15/007 |
| KR | 100752782 B1 * | 8/2007 | |
| WO | 2015162710 | 10/2015 | |

OTHER PUBLICATIONS

Nikolai Schlegel, Autonomous Vehicle Control using Image Processing, Thesis submitted to the Faculty of the Virginia Polytechnic Institute and State University in partial fulfillment of the requirements for the degree of Master of Science in Electrical Engineering, Jan. 27, 1997, Blacksburg, Virginia.

*Primary Examiner* — Tuan C To
(74) *Attorney, Agent, or Firm* — Miller, Matthias & Hull

(57) ABSTRACT

A work tool recognition system for a work tool coupled to a machine is provided. The system includes an image capturing assembly configured to capture an image feed of the work tool. A controller is communicably coupled to the image capturing assembly. The controller receives the image feed of the work tool from the image capturing assembly. The controller extracts a plurality of features of the work tool from the image feed. The controller classifies the extracted image and determine a confidence value. The controller estimates a size of the work tool. The controller estimates a position and an orientation of the work tool. The controller determines verification features of the work tool and compares the image feed of the work tool with a predetermined dataset based on the classification. The controller identifies a type of the work tool based on the comparison.

20 Claims, 4 Drawing Sheets

(51) Int. Cl.
 *G06T 7/73* (2017.01)
 *G06K 9/78* (2006.01)

(56) References Cited

U.S. PATENT DOCUMENTS

| | | | |
|---|---|---|---|
| 8,412,418 B2 * | 4/2013 | Kumagai | E02F 3/7618 |
| | | | 382/154 |
| 8,478,492 B2 | 7/2013 | Taylor et al. | |
| 8,587,622 B2 | 11/2013 | Cardoso et al. | |
| 9,428,885 B2 | 8/2016 | Nau | |
| 2004/0091347 A1 * | 5/2004 | Hackett | B28C 5/4272 |
| | | | 414/685 |
| 2005/0261799 A1 | 11/2005 | Groth et al. | |
| 2007/0177133 A1 * | 8/2007 | Cain | E02F 3/437 |
| | | | 356/139.04 |
| 2009/0257671 A1 * | 10/2009 | Fridrich | G06K 9/00577 |
| | | | 382/260 |
| 2011/0056194 A1 * | 3/2011 | Wojcicki | E02F 9/2242 |
| | | | 60/428 |
| 2012/0298640 A1 * | 11/2012 | Conrardy | B23K 37/04 |
| | | | 219/130.01 |
| 2016/0138247 A1 | 5/2016 | Conway et al. | |
| 2016/0138248 A1 | 5/2016 | Conway et al. | |
| 2016/0221196 A1 * | 8/2016 | Suzuki | B25J 15/0475 |
| 2016/0273195 A1 | 9/2016 | Chang | |
| 2016/0299116 A1 * | 10/2016 | Talmaki | G01N 33/24 |
| 2016/0312432 A1 | 10/2016 | Wang et al. | |
| 2017/0175363 A1 * | 6/2017 | Clarke | E02F 9/26 |
| 2017/0226808 A1 * | 8/2017 | Vandapel | E21B 12/06 |
| 2017/0299404 A1 * | 10/2017 | Wang | G01S 7/497 |
| 2017/0300040 A1 * | 10/2017 | Butler | G05B 19/4155 |

* cited by examiner

SYSTEM AND METHOD FOR WORK TOOL RECOGNITION

TECHNICAL FIELD

The present disclosure relates to a system associated with a work tool of a machine, and more particularly to the system and method for recognizing a type of the work tool attached to the machine.

BACKGROUND

Construction and mining machines, such as a wheel loader, may use a variety of work tools for various tasks. For example, the wheel loader may use a bucket for moving earth and a fork for picking up pallets. The machine generally includes a work tool control system which makes use of specific algorithms for controlling the operation of the work tool based on a type of the work tool that is attached to the machine. In order to load and utilize the appropriate algorithm, the control system must be aware of the type of the work tool that is connected to the machine and/or a type of task that the machine needs to perform using the work tool.

Generally, an operator using the machine may be involved in assisting the control system to identify the type of work tool so that the correct algorithm may be selected by the system. The operator may need to navigate through several layers of menus presented on a graphical user interface so that the operator may manually identify the type of the work tool attached to the machine. However, this process may be time consuming, laborious, and may overburden the operator for inputting correct selections at every stage of the menu which may otherwise lead to incorrect detection of the work tool type. Sometimes, the operator may be unaccustomed to the system or may not pay enough attention while making some of the selections, making it more difficult for the operator to navigate through the inter-related menu structure. Incorrect detection of the type of the work tool may lead to degraded performance of the system, affecting overall system productivity and efficiency.

United States Published Application Number 2016/0312432 describes a method for installing a work tool for a machine. The method includes detecting, at an electronic controller unit of a machine, a work tool based upon a first input signal from a sensor coupled to the electronic controller unit. The method includes determining, at the electronic controller unit, a first three-dimensional location of the work tool relative to the machine. The method includes detecting, at the electronic controller unit, an occlusion of the work tool. The method includes determining, at the electronic controller unit, a second three-dimensional location of the work tool upon the detecting of the occlusion based on the first three-dimensional location. The method includes controlling, at the electronic controller unit, a motion of the machine for installing the work tool based upon the second three-dimensional location.

SUMMARY OF THE DISCLOSURE

In one aspect of the present disclosure, a work tool recognition system for a work tool coupled to a machine is provided. The work tool recognition system includes an image capturing assembly associated with the work tool. The image capturing assembly is configured to capture an image feed of the work tool. A controller is communicably coupled to the image capturing assembly. The controller is configured to receive the image feed of the work tool from the image capturing assembly. The controller is configured to extract a plurality of features of the work tool from the image feed using image analysis. The controller is configured to classify the extracted image and determine a confidence value associated with the classification. The controller is configured to estimate a size of the work tool based on information associated with the image capturing assembly. The controller is configured to estimate a position and an orientation of the work tool. The controller is configured to determine verification features of the work tool based on the confidence value and the estimated size, position, and orientation. The controller is configured to compare the image feed of the work tool with a predetermined dataset based on the classification. The controller is configured to identify a type of the work tool based on the comparison.

In another aspect of the present disclosure, a method for recognizing a work tool coupled to a machine is provided. The method includes receiving, by a controller, an image feed of the work tool from an image capturing assembly. The method includes extracting, by the controller, a plurality of features of the work tool from the image feed using image analysis. The method includes classifying, by the controller, the extracted image and determining a confidence value associated with the classification. The method includes estimating, by the controller, a size of the work tool based on information associated with the image capturing assembly. The method includes estimating, by the controller, a position and an orientation of the work tool. The method includes determining, by the controller, verification features of the work tool based on the confidence value and the estimated size, position, and orientation. The method includes comparing, by the controller, the image feed of the work tool with a predetermined dataset based on the classification. The method includes identifying, by the controller, a type of the work tool based on the comparison.

In yet another aspect, a machine is provided. The machine includes a work tool configured to be coupled to the machine. The machine also includes a work tool recognition system for the work tool. The work tool recognition system includes an image capturing assembly associated with the work tool. The image capturing assembly is configured to capture an image feed of the work tool. A controller is communicably coupled to the image capturing assembly. The controller is configured to receive the image feed of the work tool from the image capturing assembly. The controller is configured to extract a plurality of features of the work tool from the image feed using image analysis. The controller is configured to classify the extracted image and determine a confidence value associated with the classification. The controller is configured to estimate a size of the work tool based on information associated with the image capturing assembly. The controller is configured to estimate a position and an orientation of the work tool. The controller is configured to determine verification features of the work tool based on the confidence value and the estimated size, position, and orientation. The controller is configured to compare the image feed of the work tool with a predetermined dataset based on the classification. The controller is configured to identify a type of the work tool based on the comparison.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
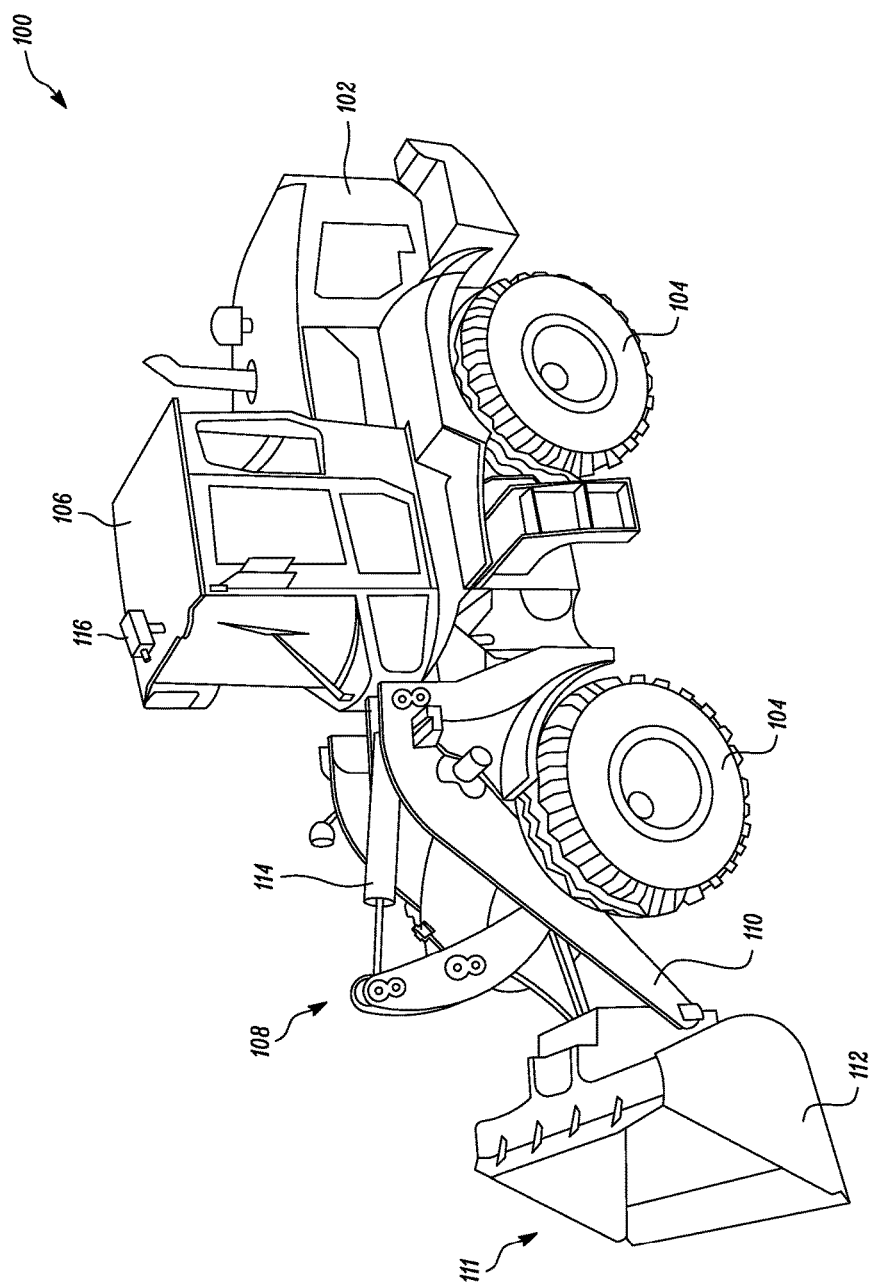
FIG. 1 is a perspective view of an exemplary machine, according to various concepts of the present disclosure.

FIG. 1 represents an exemplary machine 100, according to one embodiment of the present disclosure. More specifically, the machine 100 is embodied as a wheel loader. Alternatively, the machine 100 may include any other earthmoving machine such as a motor grader, an excavator, a wheel tractor scraper, etc. or any other machine on which different types of work tools may be attached.

Referring to FIG. 1, the machine 100 includes a frame 102. A powertrain and/or a drivetrain (not shown) is also provided on the machine 100 for the production and transmission of motive power. The powertrain includes a power source (not shown) and is located within an enclosure of the machine 100. The power source may include one or more engines or other power delivery systems such as batteries, hybrid engines, and the like.

The machine 100 also includes wheels 104 for the purpose of mobility. The powertrain may also include a torque converter, a transmission system inclusive of gearing, a drive shaft and other known drive links provided between the power source and the wheels 104 for the transmission of the motive power. Further, the machine 100 has an operator cabin 106 that houses controls for operating the machine 100.

As shown in FIG. 1, a linkage assembly 108 is attached to the frame 102 of the machine 100. The linkage assembly 108 includes a lift arm 110. A work tool 111, such as a bucket 112, is pivotally coupled to the lift arm 110 through a coupling mechanism (not shown). In some embodiments, the coupling mechanism may include a quick coupler for coupling the work tool 111 with the machine 100. The work tool 111 may be removably connected to the machine 100 via the coupling mechanism. During operation of the machine 100, the lift arm 110 and the bucket 112 may be moved to different positions in order to perform excavation and dumping tasks. The movement of the lift arm 110 and/or the bucket 112 is controlled by hydraulic and/or pneumatic cylinders 114, which are coupled to these parts. Accordingly, based on the movement of the lift arm 110 and the bucket 112, the machine 100 may perform different operations such as excavating, loading, and dumping.

Figure 3:
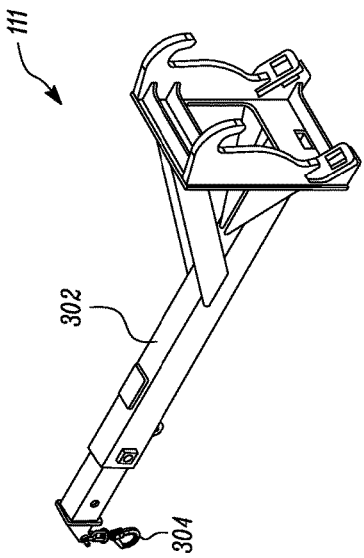
FIGS. 2 to 5 are perspective views of different exemplary work tools for the machine of FIG. 1, according to various concepts of the present disclosure.
Figure 2:
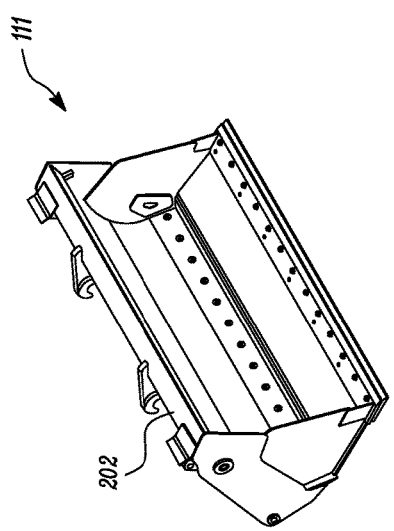

Although the bucket 112 is shown coupled to the machine 100 in FIG. 1, the work tool 111 that is attached to the machine 100 may vary based on the type of operation or task to be performed. For example, referring to FIGS. 2 to 5, other exemplary work tools 202, 302, 402, 502 are illustrated which, instead of the bucket 112, may be coupled to the machine 100 to perform certain tasks. Referring to FIG. 2, an exemplary multi-purpose bucket 202 is illustrated. The multi-purpose bucket 202 may be capable of performing a number of different functions as compared to regular buckets. The multi-purpose bucket 202 may be used for example to dig, load, spread, grade, grab, and doze. Alternatively, referring to FIG. 3, an exemplary material handling arm 302 is illustrated. The material handling arm 302 may be coupled to the machine 100 for transporting load from one place to another. The load, in the form of cartons or packaged boxes, may be fastened to a hook portion 304 of the material handling arm 302 and lifted, transported, and lowered at a desired location.

Figure 5:
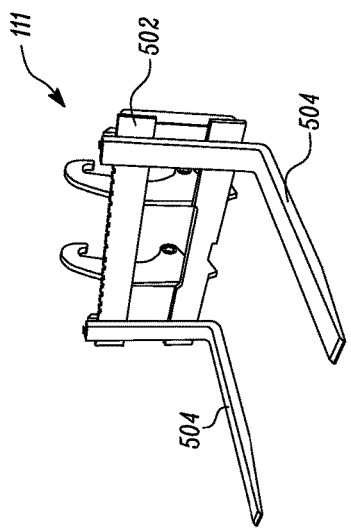
Figure 4:
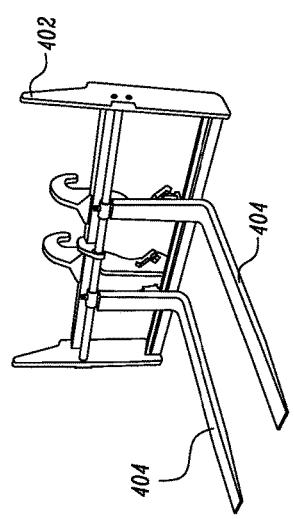

In other embodiments, referring to FIGS. 4 and 5, any one of a construction fork 402 or a pallet fork 502 may be attached to the machine 100 respectively based on a type and a size of the load to be transported. The construction fork 402 may be used to transport bigger and heavier loads as compared to the pallet fork 502. Each of the construction and pallet forks 402, 502 include a pair of forks 404, 504 respectively which are adapted to slide under a pallet containing heavy materials to be shifted from place to place. The pair of forks 404, 504 slide under the pallet, lift the pallet and the materials, transport the materials to the desired place, lower the materials, and slide out from under the pallet. It should be noted that the work tools 111 described herein are merely on an illustrative basis and do not limit the scope of the present disclosure. Other different types of work tools 111 may also be utilized by the system that are not described herein.

Accordingly, based on the type of task to be performed, any one of the work tools 111 may be attached to the machine 100. In some cases, after completing a certain task, the work tool 111 attached to the machine 100 may be changed to another work tool 111 to perform other tasks. In this case, the work tool 111 that is currently attached to the machine 100 may be decoupled from the machine 100 and the new work tool 111 may be re-attached to the coupling mechanism.

Figure 6:
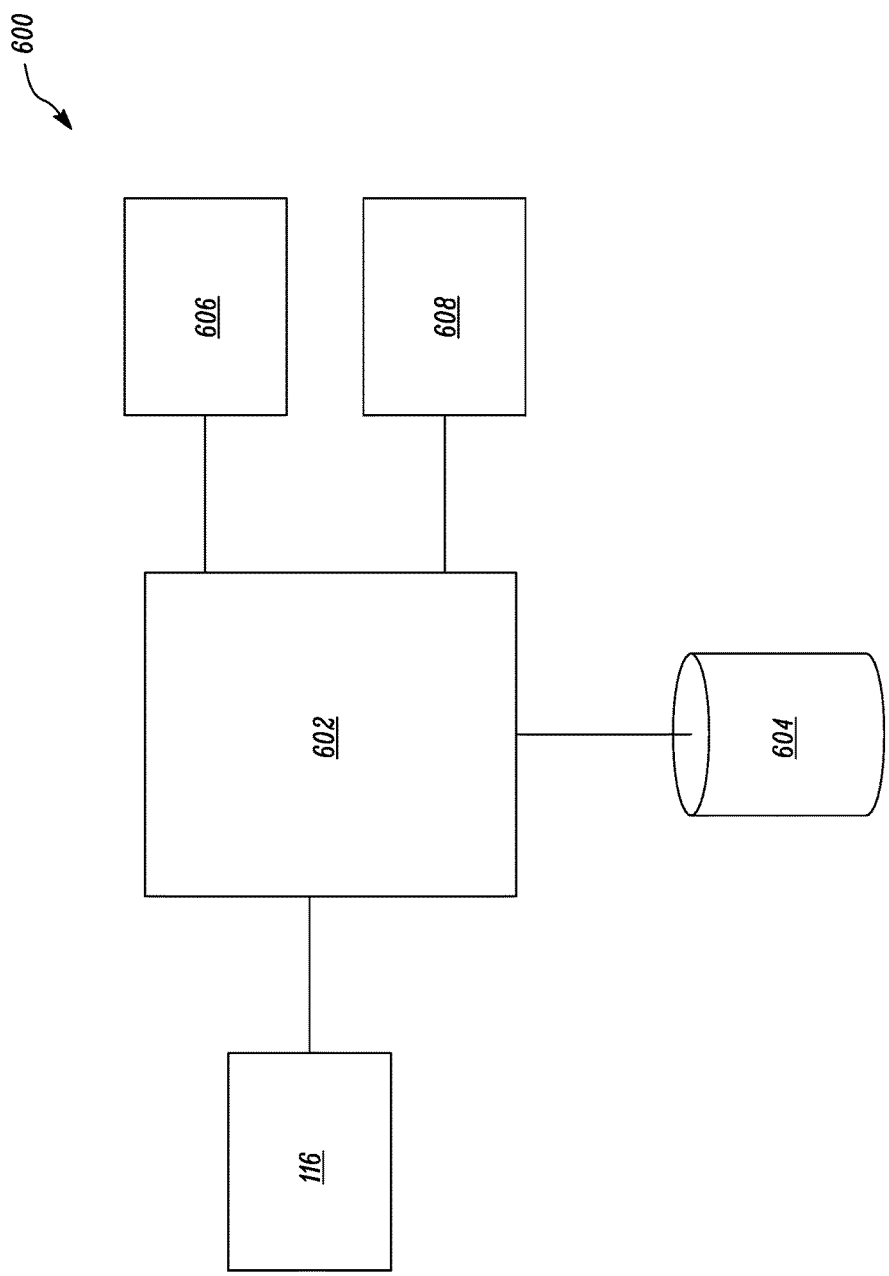
FIG. 6 is a block diagram of a work tool recognition system for the machine of FIG. 1, according to various concepts of the present disclosure.

The present disclosure relates to a work tool recognition system 600 (see FIG. 6) for automatically identifying the type of work tool 111 attached to the machine 100. Referring to FIGS. 1 and 6, the work tool recognition system 600 includes an image capturing assembly 116. The image capturing assembly 116 may include a camera, a camcorder, or any other known image or video capturing device. The image capturing assembly 116 is configured to capture an image feed of the work tool 111 that is attached to the machine 100. The image capturing assembly 116 may be mounted on the operator cabin 106. As shown in FIG. 1, the image capturing assembly 116 may be positioned on a roof of the operator cabin 106 and may be aimed to point at the work tool 111 that rests on a ground surface. Alternatively, a position and an orientation of the image capturing assembly 116 may vary so as to obtain an unobstructed and clear view of the work tool 111. In other embodiments, image feed from a number of image capturing assemblies that are positioned at different location on the machine 100 may be used by the system for the identification of the type of the work tool 111.

Initially, during training of the system, the machine 100 may be manually or automatically controlled to position the work tool 111 in predetermined fixed and known locations. This may ensure that the image capturing assembly 116 can capture the work tool 111 from a variety of positions and angles. Further, by fixing the position of the work tool 111, the system may be made aware of a position and an orientation of the work tool 111 relative to the machine 100, which may be used by the system for further processing. For example, on some machines, joint angle feedback associated with the work tool 111 may be provided to an electronic control module (ECM) of the machine 100, indicating the position and the orientation of the work tool 111. Alternatively, on other machines, the position and the orientation of the work tool 111 may be measured using inclinometers, range finders, and so on.

The image capturing assembly 116 is communicably coupled to a controller 602. The controller 602 receives the image feed of the work tool 111 from the image capturing assembly 116. The controller 602 then extracts a number of features of the work tool 111 from the image feed using image analysis and object recognition and detection algorithms. The controller 602 may iteratively scan the image feed for detecting and extracting distinct features of the work tool 111 based on the image features. For example, the extracted features may include colors, edges, gradients, textures, shape of the work tool 111 or any other features of the work tool 111 that may be extracted by performing the image analysis for initial identification of the type of the work tool 111.

After extracting these features, the controller 602 classifies the extracted image feed and determines a confidence value associated with the classification. The controller 602 may pass the extracted image feed through a multiclass classifier for classification and identification of the type of the work tool 111. For example, based on the extracted features of the work tool 111, the controller 602 may determine the work tool 111 to be a bucket, a fork, a material handling implement, or an empty linkage assembly having no work tool 111 attached thereto. Hence, the controller 602 may perform a preliminary analysis on or classify the work tool 111 based on the extracted features. Further, since the controller 602 processes a number of extracted work tool features over time, an algorithm of the controller 602 may accumulate confidence over time for improving on the classification of the work tool 111, forming aggregated confidence values by building and matching the image feed of the work tool 111 with training data. A person of ordinary skill in the art will appreciate that the controller 602 may utilize machine learning algorithms or other known processes to build the training data over time using supervised and unsupervised learning techniques for robust identification of the extracted features.

The controller 602 may determine a confidence value associated with the classification and/or the preliminary identification of the work tool 111. This confidence value may be a score or a percentage value indicative of a degree of confidence that the system has in correctly identifying the type of the work tool 111. For example, if based on the extracted features the controller 602 is able to successfully identify the type of the work tool 111, then the confidence value may be high. However, if the system is unsure of the type of the work tool 111, then the confidence value may be low. The confidence value may be low for a number of reasons, for example, if the image feed is captured in low ambient light conditions or if a background color matches with a color of one or more parts of the work tool 111, the system may have difficulty in correctly extracting the features of the work tool 111 and identifying the type of the work tool 111. In some embodiments, the controller 602 may compare the confidence value with a predetermined threshold which is stored and retrieved from a database 604 connected to the controller 602. The database 604 may include any known data source, external data repository or other data storage medium for storage of information.

If the confidence value is lesser than the predetermined threshold, indicating that the controller 602 is unable to successfully determine the type of the work tool 111 then, in some embodiments, the controller 602 may prompt an operator to provide certain inputs for assisting the controller 602 in identifying the type of the work tool 111. For example, the controller 602 may display a message to the operator, requesting the operator to provide some additional information regarding the work tool 111 so that the controller 602 may be able to identify the type of the work tool 111. In another example, if the controller 602 is uncertain between two different types of work tools, then the controller 602 may display a message to allow the operator to select the correct work tool type. Accordingly, the controller 602 may be coupled to an input unit (not shown) such as, but not limited to, a keypad, a control panel, a touch screen or any other suitable input device for receiving the input from the operator. Further, the controller 602 is also coupled to an output unit 606 such as, a touchscreen, a screen, a monitor, or any other display unit for displaying messages and notifications to the operator.

The controller 602 additionally estimates a scale or a size of the work tool 111 on the basis of information associated with the image capturing assembly 116. This information may include intrinsic and extrinsic information associated with the image capturing assembly 116 such as, but not limited to, the position of the image capturing assembly 116, the orientation or angle at which the image capturing assembly 116 is pointed at, and/or image capturing attributes such as type of lens, number of pixels, focus angle, and so on of the image capturing assembly 116.

The controller 602 may then estimate the position and the orientation of the work tool 111 which is coupled to the machine 100. In one example, the controller 602 may be coupled to a position detection sensor on-board the machine 100 and may receive signals from the position detection sensor indicating the position and the orientation of the work tool 111. In another example, the controller 602 may use image analysis to detect and ascertain a position of the cylinders 114 that are connected to the work tool 111. Based on the position of the cylinders 114, the controller 602 may correspondingly determine the position and the orientation of the work tool 111. Alternatively, the controller 602 may make use of any other method to determine the position and the orientation of the work tool 111. The controller 602 may then map a usage motion profile of the work tool 111 with an expected motion of the work tool 111 based on the classification of the work tool 111. The controller 602 may compare the motion of the work tool 111 with the expected motion based on the operations that the controller 602 predicts corresponding to the identified type of the work tool 111. If the actual motion of the work tool 111 matches with the expected motion of the work tool 111, the confidence value in the classification increases.

The controller 602 may then determine a number of verification features in the image feed to further validate the classification of the work tool 111 that is based on the extracted features, the aggregated confidence value, the size estimate, and/or the usage of the work tool 111 as described above. These verification features may include specific features associated with the work tool 111 that may be extracted from the image feed to further build confidence in the assessment of work tool 111 performed by the controller 602. For example, these verification features and associated actions may include, counting number of teeth present on the work tool 111, checking for presence of specific external markings or logos, and so on. Further, the size of the work tool 111 estimated by the controller 602 may also be verified based on the verification features, for example, the controller 602 may verify the size of the bucket 112, length and width of the pair of forks 404, 504, articulation of the pair of forks 404, 504, and so on. This may result in a high confidence classification of the work tool 111.

Based on the classification of the image feed, the controller 602 may then compare the image feed of the work tool 111 with a predetermined dataset for identifying the type of the work tool 111. The predetermined dataset may be stored in the database 604 and may be accessed for data retrieval, update, and modification by the controller 602. The predetermined dataset includes data related to different types of the work tool 111. The predetermined dataset is a previously stored work tool classification including image libraries associated with the different types of the work tool 111. The controller 602 compares the image feed of the work tool 111 with the predetermined dataset in search of a match.

If the match is found, the controller 602 identifies the type of the work tool 111 based on the matching entry in the predetermined dataset. Alternatively, if the match is not found or the classification or comparison fails, the controller 602 may display a notification to the operator via the output unit 606 to verify the type of the work tool 111 or to return to factory settings.

The controller 602 may also be coupled to the ECM 608 of the machine 100. The controller 602 may automatically select a control algorithm for operating the identified type of the work tool 111. This selected algorithm may be loaded in a memory of the ECM 608 or any other work tool control module to appropriately operate the work tool 111 based on the type of the work tool 111 identified by the controller 602. Additionally or optionally, the controller 602 may display a notification of the identified type of the work tool 111 via the output unit 606. Further, in some cases certain parameters associated with the operation of the work tool 111 may be automatically tuned by the controller 602 based on the type of the work tool 111 identified by the controller 602. For example, in case of the bucket 112, based on the estimated size of the bucket 112, a bucket shake parameter may be set more aggressively for a small bucket, but more conservatively for a large bucket.

Work tool data including the type of the work tool 111 and time and date information associated with the identification of the work tool 111 may be stored in a memory of the machine 100 or the database 604 when the change in the work tool 111 is determined and verified by the controller 602. In some embodiments, the system may be activated or triggered during start-up of the machine 100. For example, a key-on action on the machine 100 may cause the activation of the system. In other embodiments, the system may be activated based on the engagement of the quick coupler, indicating that the work tool 111 is attached to the machine 100. Alternatively, the system may receive command signals from the ECM 608 of the machine 100 based on an engagement or a disengagement of the work tool 111.

The controller 602 may embody a single microprocessor or multiple microprocessors. Numerous commercially available microprocessors can be configured to perform the functions of the controller 602. The controller 602 may include all the components required to run an application such as, for example, a memory, a secondary storage device, and a processor, such as a central processing unit or any other means known in the art. Various other known circuits may be associated with the controller 602, including power supply circuitry, signal-conditioning circuitry, solenoid driver circuitry, communication circuitry, and other appropriate circuitry.

INDUSTRIAL APPLICABILITY

Figure 7:
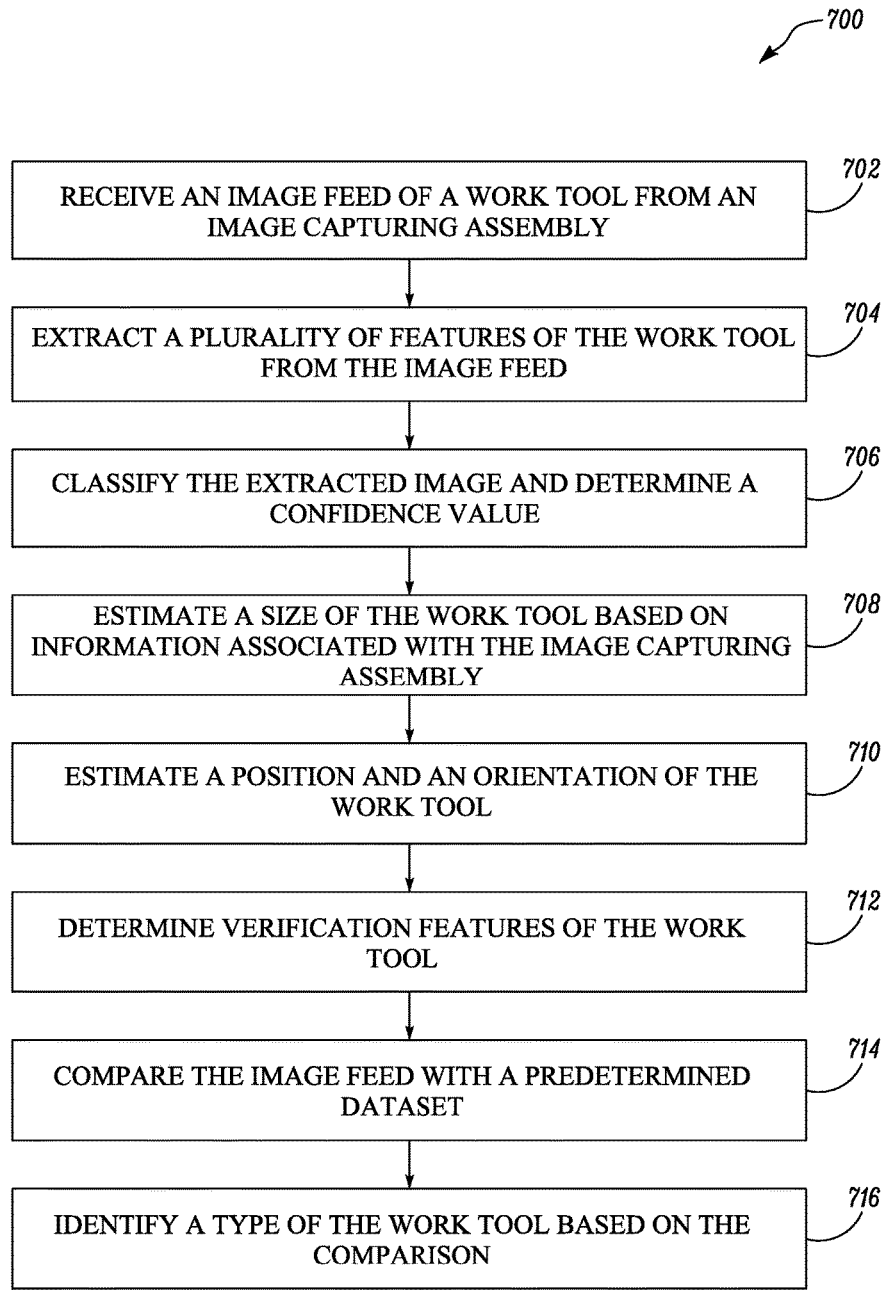
FIG. 7 is a flow chart of a method for recognizing the work tool of the machine, according to various concepts of the present disclosure.

The present disclosure provides an automatic system and method for recognizing the type of the work tool 111 that is attached to the machine 100. Referring to FIG. 7, a method 700 for recognizing the type of the work tool 111 is provided. At step 702, the controller 602 receives the image feed of the work tool 111 from the image capturing assembly 116. At step 704, the controller 602 extracts the plurality of features of the work tool 111 from the image feed using image analysis. At step 706, the controller 602 classifies the extracted image and determines the confidence value associated with the classification. At step 708, the controller 602 estimates the size of the work tool 111 based on information associated with the image capturing assembly 116. At step 710, the controller 602 estimates the position and the orientation of the work tool 111. At step 712, the controller 602 determines the verification features of the work tool 111 based on the confidence value and the estimated size, position, and orientation. At step 714, the controller 602 compares the image feed the work tool 111 with the predetermined dataset based on the classification. At step 716, the controller 602 identifies the type of the work tool 111 based on the comparison.

The system automatically detects the type of the work tool 111 attached to the machine 100. Further, the system may automatically select the appropriate control algorithm for operating the specific type of the work tool 111 that is identified by the system. This identification of the work tool 111 is conducted by the controller 602 based on image comparison of a live image feed with the predetermined dataset. Further, the controller 602 also builds confidence in the identification based on a number of classifications performed on the image feed including, feature extraction, aggregated confidence value based classification, estimated size based classification, work tool motion or usage based classification, and verification features based classification. The system does not require attachment of RFID tags or other similar identification devices to each and every work tool. Additionally, the work tool identification may take place with minimum or no operator intervention, reducing the burden on the operator and enhancing the operator and machine efficiency and performance.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A work tool recognition system for a work tool coupled to a machine, the work tool recognition system comprising:
   an image capturing assembly associated with the work tool, the image capturing assembly configured to capture an image feed of the work tool; and
   a controller communicably coupled to the image capturing assembly, the controller configured to:
   receive the image feed of the work tool from the image capturing assembly;
   extract a plurality of features of the work tool from the image feed using image analysis;
   classify the extracted image and determine a confidence value associated with the classification;
   estimate a size of the work tool based on information associated with the image capturing assembly;
   estimate a position and an orientation of the work tool;

determine verification features of the work tool based on the confidence value and the estimated size, position, and orientation;

compare the image feed of the work tool with a predetermined dataset based on the classification; and identify a type of the work tool based on the comparison.

2. The work tool recognition system of claim 1, wherein the controller is further configured to display a notification of the identified type of the work tool.

3. The work tool recognition system of claim 1, wherein the controller is further configured to select a control algorithm for operating the identified type of the work tool.

4. The work tool recognition system of claim 1, wherein the image capturing assembly is mounted on an operator cab of the machine.

5. The work tool recognition system of claim 1, wherein the controller is configured to receive signals from a position detection sensor for estimating the position and the orientation of the work tool.

6. The work tool recognition system of claim 1, wherein the controller is configured to determine a position of cylinders attached to the work tool by image analysis for estimating the position and the orientation of the work tool.

7. The work tool recognition system of claim 1, wherein the controller is configured to prompt a user to provide an input for assisting in identifying the type of the work tool if the determined confidence value is lesser than a predetermined threshold.

8. The work tool recognition system of claim 1, wherein the system is activated on start-up of the machine.

9. The work tool recognition system of claim 1, wherein the system is activated based on an engagement of a quick coupler associated with the work tool for coupling the work tool with the machine.

10. The work tool recognition system of claim 1, wherein the information associated with the image capturing assembly includes at least one of a position, an orientation, and image capturing attributes of the image capturing assembly.

11. The work tool recognition system of claim 1, wherein the plurality of features include at least one of colors, gradients, textures, edges, and shapes associated with the work tool.

12. The work tool recognition system of claim 1, wherein the verification features include at least one of number of teeth, external markings, and dimensions of the work tool.

13. The work tool recognition system of claim 1, wherein the predetermined dataset includes data related to different types of the work tool.

14. A method for recognizing a work tool coupled to a machine, the method comprising:

receiving, by a controller, an image feed of the work tool from an image capturing assembly;

extracting, by the controller, a plurality of features of the work tool from the image feed using image analysis;

classifying, by the controller, the extracted image and determining a confidence value associated with the classification;

estimating, by the controller, a size of the work tool based on information associated with the image capturing assembly;

estimating, by the controller, a position and an orientation of the work tool;

determining, by the controller, verification features of the work tool based on the confidence value and the estimated size, position, and orientation;

comparing, by the controller, the classification of the work tool with a predetermined dataset; and identifying, by the controller, a type of the work tool based on the comparison.

15. The method of claim 14 further comprising:
displaying, by the controller, a notification of the identified type of the work tool.

16. The method of claim 14 further comprising:
selecting, by the controller, a control algorithm for operating the identified type of the work tool.

17. The method of claim 14 further comprising:
prompting, by the controller, a user to provide an input for assisting in identifying the type of the work tool if the determined confidence value is lesser than a predetermined threshold.

18. A machine comprising:
a work tool configured to be coupled to the machine; and
a work tool recognition system for the work tool, the work tool recognition system comprising:
an image capturing assembly associated with the work tool, the image capturing assembly configured to capture an image feed of the work tool; and
a controller communicably coupled to the image capturing assembly, the controller configured to:
receive the image feed of the work tool from the image capturing assembly;
extract a plurality of features of the work tool from the image feed using image analysis;
classify the extracted image and determine a confidence value associated with the classification;
estimate a size of the work tool based on information associated with the image capturing assembly;
estimate a position and an orientation of the work tool;
determine verification features of the work tool based on the confidence value and the estimated size, position, and orientation;
compare the image feed of the work tool with a predetermined dataset based on the classification; and
identify a type of the work tool based on the comparison.

19. The machine of claim 18, wherein the controller is further configured to display a notification of the identified type of the work tool.

20. The machine of claim 18, wherein the controller is further configured to select a control algorithm for operating the identified type of the work tool.

* * * * *